(12) United States Patent
Hara et al.

(10) Patent No.: US 6,435,294 B1
(45) Date of Patent: Aug. 20, 2002

(54) CONTROL DEVICE FOR HYBRID VEHICLE

(75) Inventors: Kazuhiro Hara; Shinobu Ochiai, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/686,903

(22) Filed: Oct. 12, 2000

(30) Foreign Application Priority Data

Oct. 13, 1999 (JP) .......................................... 11-291698

(51) Int. Cl.⁷ ................................................. B60K 1/00
(52) U.S. Cl. ..................................... 180/65.4; 180/65.2
(58) Field of Search ............................ 180/65.2, 65.3, 180/65.4, 65.6, 65.8; 701/22; 318/139; 477/2, 3, 4, 5; 475/5

(56) References Cited

U.S. PATENT DOCUMENTS

| | | | | | |
|---|---|---|---|---|---|
| 3,205,965 | A | * | 9/1965 | Roth | 180/65.2 |
| 4,902,956 | A | | 2/1990 | Sloan | 320/13 |
| 5,085,955 | A | * | 2/1992 | Cipriano | 429/197 |
| 5,614,809 | A | * | 3/1997 | Kiuchi et al. | 322/11 |
| 5,698,955 | A | * | 12/1997 | Nii | 318/319 |
| 5,785,137 | A | * | 7/1998 | Reuyl | 180/65.2 |
| 5,786,640 | A | | 7/1998 | Sakai et al. | 290/17 |
| 5,806,617 | A | * | 9/1998 | Yamaguchi | 180/65.2 |
| 5,847,469 | A | * | 12/1998 | Tabata et al. | 290/40 C |
| 5,929,608 | A | * | 7/1999 | Ibaraki et al. | 322/16 |
| 5,969,624 | A | * | 10/1999 | Sakai et al. | 340/636 |
| 6,018,694 | A | * | 1/2000 | Egami et al. | 701/102 |
| 6,019,183 | A | * | 2/2000 | Shimasaki et al. | 180/165 |
| 6,204,636 | B1 | * | 3/2001 | Kinoshita et al. | 320/134 |
| 6,208,034 | B1 | * | 3/2001 | Yamaguchi | 290/40 C |
| 6,209,672 | B1 | * | 4/2001 | Severinsky | 180/65.2 |
| 6,215,198 | B1 | * | 4/2001 | Inada et al. | 290/40 C |
| 6,232,744 | B1 | * | 5/2001 | Kawai et al. | 320/132 |
| 6,314,346 | B1 | * | 11/2001 | Kitajima et al. | 701/22 |

FOREIGN PATENT DOCUMENTS

| | | |
|---|---|---|
| DE | DE 33 03 147 C2 | 8/1983 |
| DE | DE 690 18 773 T2 | 5/1991 |
| DE | DE 10 39 436 A1 | 6/1992 |
| DE | DE 693 27 072 T2 | 11/1993 |
| DE | DE 694 16 184 T2 | 10/1994 |
| EP | EP 0 830 968 A1 | 3/1998 |
| JP | 837702 | * 2/1996 |

* cited by examiner

*Primary Examiner*—Brian L. Johnson
*Assistant Examiner*—Bryan Fischmann
(74) *Attorney, Agent, or Firm*—Arent Fox Kintner Plotkin & Kahn

(57) ABSTRACT

A control device of a hybrid vehicle is provided, capable of detecting the over-discharge state of the battery and controlling the charging and discharging rates of the battery for protecting the battery. The control device of the hybrid vehicle comprises an engine which outputs propulsive force to the vehicle, a motor which is directly connected to said engine and which assists the output of the engine, a battery which supplies the electric power to said motor and which is charged by electric energy generated by activating said motor as a generator when the assisting driving force is not necessary, an electric load whose electric energy is supplied by electric power generated by the motor and the battery, and a battery protecting device which increases the rotation speed of said engine when the over-discharge of said battery is detected and which stops supplying the electric power to said electric load when the over-discharge further advances.

2 Claims, 6 Drawing Sheets

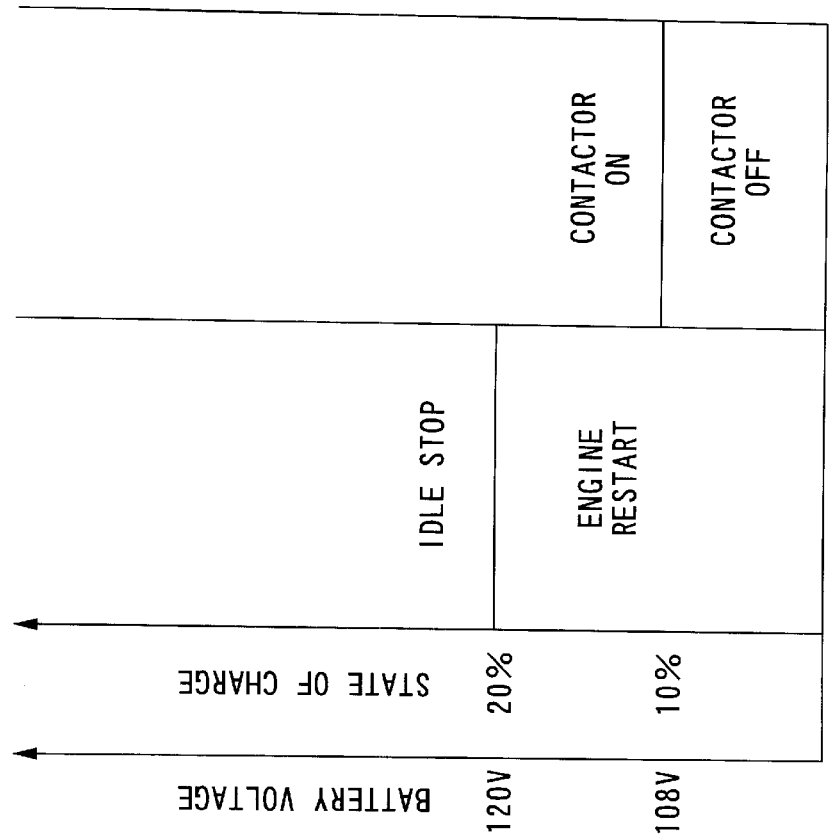
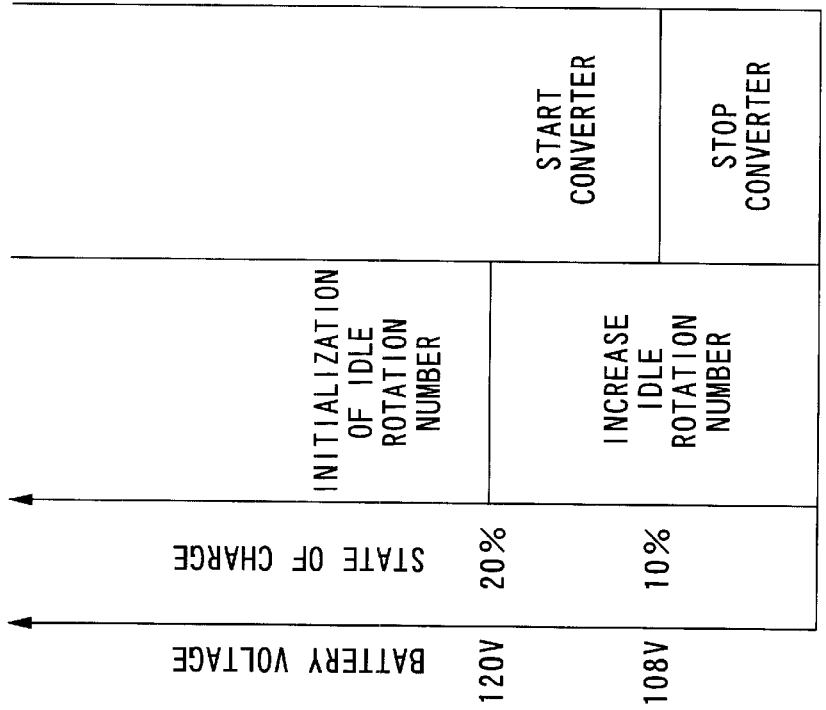

CONTROL DEVICE FOR HYBRID VEHICLE

BACKGROUND OF THE INVENTION

1. Field of the Invention

The present invention relates to a control system for controlling an amount of charging or discharging of a battery for protecting batteries installed in hybrid vehicles.

2. Background Art

Conventionally, hybrid vehicles provided with a motor in addition to an engine are known. There are two types of hybrid vehicles: series hybrid vehicles and parallel hybrid vehicles. Series hybrid vehicles are driven by motors which are driven by the output of a generator driven by the engine.

Since the motor is not connected mechanically with the engine, the engine can be driven at an approximately constant rotation speed within a speed region wherein the engine can be driven at a lower fuel consumption rate and lower emission rate than the case of a conventional engine.

In contrast, in parallel hybrid vehicles, a motor directly connected to the engine assists the engine in rotating the drive shaft, and the motor is used as a generator for charging electric energy into a storage battery, and the electric energy generated by the motor is used for various electrical equipment in hybrid vehicles.

Thus, in parallel hybrid vehicles, since the driving load of the engine can be reduced, the fuel consumption and emission rates can be improved.

There are a few types of the above-described parallel hybrid vehicles, one is a type, in which a motor, connected directly to the output axis of the engine, functions as a generator for charging the battery when the hybrid vehicle decelerates, and the other one is a type in which both or either one of the engine or the motor can generate the driving force and a generator is additionally provided.

In such hybrid vehicles described above, the demands of the driver can be satisfied by preserving the electric energy of the battery (hereinafter, called "state of charge", that is the remaining battery charge), by carrying out a variety of controls such that the motor assists the engine at the time of acceleration, and the motor charges the battery by deceleration regeneration at the time deceleration.

However, the battery provided in a hybrid vehicle is used in such a way that the battery can supply an insufficient electric power, when the electric power to be supplied to the electric equipment provided in the vehicle exceeds the electric power generated by the motor. That is, a problem arises that when the engine is in an idling rotation mode, the electric power consumed by the electric equipment is liable to exceed the electric power generated by the motor, and thus the battery is liable to be over-discharged. Overdischarge is typically understood to occur when the state of charge of the battery is approximately 20%. If the battery installed in the hybrid vehicle is in the over-discharged state, the vehicle must be driven only by the engine, which results in causing degradation of the fuel consumption and the power performance of the hybrid vehicle.

SUMMARY OF THE INVENTION

It is, therefore, an object of the present invention to provide a control apparatus for hybrid vehicles for controlling charging and discharging rates for protecting the battery in response to the occurrence state of over-discharged state of the battery by detecting the over-discharge state.

The first aspect of the present invention provides a control device of a hybrid vehicles which comprises: an engine which outputs a propulsive force for the vehicle; a motor which is directly connected to said engine and which assists the output of the engine; a battery which supplies electric power to said motor and which is charged by electric energy generated by activating said motor as a generator when the assisting driving force is not necessary; an electric load whose electric energy is supplied by the electric power generated by the motor and the battery; and a battery protecting device which increases the rotation speed of said engine when an over-discharge state of said battery is detected and which stops supplying the electric power to said electric load when the over-discharge state further advances.

An effect of the control device of the hybrid vehicle according to the first aspect is that it provides the capability to protect the battery from falling into the over-discharge state by stepwise execution of the steps of "increasing the amount of generated power by increasing the engine idle speed" and "cutting the electric load by stopping the converter for supplying power to the electric equipment", when the state of charge of the battery is decreasing while driving in the idle mode. In addition, the control device has a further effect that the control device of the present invention can prevent an increase in the fuel consumption and a reduction of the power of the hybrid vehicles.

A control device of a hybrid vehicle according to the second aspect, the hybrid vehicle having an engine which outputs propulsive force for the vehicle, a motor which is connected to said engine and which assists the output of the engine, a battery which supplies electric power to said motor and which is charged by electric energy generated by activating said motor as a generator when the assisting driving force is not necessary, an electric load whose electric energy is supplied by electric power generated by the motor and the battery, the control device comprises a contactor for connecting and disconnecting a current supply between said battery and said motor, an engine stopping device which stops said engine in response to predetermined driving conditions and a battery protecting device which restarts the engine when it is detected that the over-discharged state of the battery is further advanced after the engine is restarted.

The effect of the control device of the hybrid vehicle according to the second aspect is that it is capable of protecting the battery from falling into the over-discharge state by providing a contactor for connecting and disconnecting the current supply between the engine and the motor, an engine stop device for stopping the engine under certain driving conditions, and a battery protecting device which disconnects the contactor when the over-discharge state of the battery is detected for stopping the electric power supplyied to the electric equipment while the engine is in the idling mode. That is, when the battery falls into the over-discharge state and when it is possible to generate electricity by the motor, since the supply of the electric power to the other electric equipment can be completely stopped by disconnecting the contactor, all of the electric power generated by the motor can be directed to and stored in the battery, the advance of the over-discharge state can be prevented.

BRIEF DESCRIPTION OF THE DRAWINGS

FIG. 6 is a diagram explaining the constitution of the determination map 53*a* shown in FIG. 2.

FIG. 7 is a diagram explaining the constitution of the determination map 53*b* shown in FIG. 2.

DETAILED DESCRIPTION OF THE INVENTION

Hereinafter, one embodiment of the present invention is described in detail with reference to the attached drawings.

Figure 1:
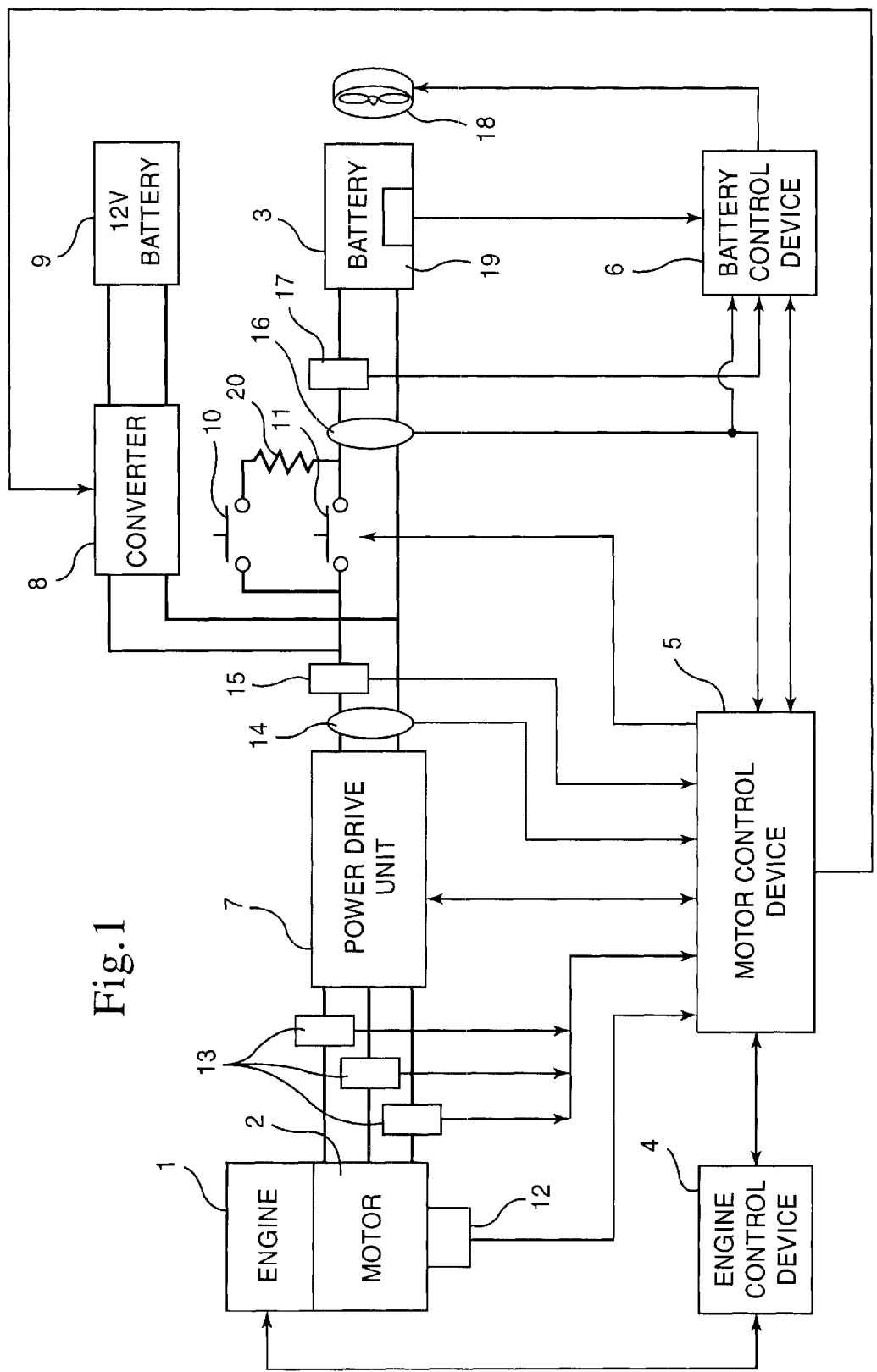
FIG. 1 is a block diagram showing the structure of the control apparatus of hybrid vehicles.

FIG. 1 is a block diagram showing the entire structure of a parallel hybrid vehicle, which is one type of hybrid vehicle, according to the embodiment of the present invention. In this figure, reference numeral 1 is a combustion engine that operates with the combustion energy of fuel, and reference numeral 2 is an electric motor that is used in parallel with the engine and operates by electric energy. The drive power of both the engine 1 and the motor 2 is transmitted to the drive wheels (not illustrated) via the transmission (not illustrated), comprising an automatic transmission or a manual transmission.

In addition, during deceleration of the hybrid vehicle, the drive energy is transmitted from the drive wheels to the motor 2, and the motor 2 functions as a power generator. The motor 2 transforms the kinetic energy of the vehicle body into electrical energy, and the battery is charged, as explained below. Moreover, the drive motor 2 can be structured to provide the electrical generator for charging the battery 3 separately.

Reference numeral 3 denotes a battery for supplying electric power to the motor 2 and for charging the battery with electric energy obtained by actuating the motor 2 as a generator when the motor's energy is not necessary for driving the vehicle. Here, the battery 3 has, for example, a plurality of modules connected in series, with these modules in turn comprising a plurality of cells connected in series, and serving as a unit, to form a high voltage battery. Reference numeral 19 is a temperature sensor mounted in the module.

Reference numeral 4 is an engine control device that monitors the engine speed, velocity of the vehicle, etc., at specified intervals, and, based on these results, the driving modes are determined such as the motor regeneration mode, the assistance mode, and the deceleration mode. In addition, the engine control device 4 simultaneously carries out determination of the assistance/regeneration amount depending on the mode described below, and outputs information related to these modes and the assistance/regeneration amount, for example, to the motor control device 5. When the motor control device 5 receives this information from the engine control device 4, control of the power drive unit 7 and the like that drives and regenerates the motor 2 according to its commands is carried out.

Reference numeral 6 is a battery control device that carries out calculation of the SOC (state of charge; that is, the "remaining battery charge") of the battery 3. In addition, the battery control device 6 carries out control of the fan 18 that is disposed in proximity to the battery 3 so as to maintain the temperature thereof equal to or less than a specified value in order to protect the battery 3.

Moreover, the engine control device 4, the motor control device 5, and the battery control device 6 are formed by a sequencer or a CPU (Central Processing Unit) and memory, which can realize these functions by executing a program for realizing the function of a control device.

Reference numeral 7 is a power drive unit that is formed by two switching elements connected in series or three switching elements connected in parallel. A switching element in this power drive unit 7 is turned ON or OFF by the motor control device 5, and supplies the high voltage DC component, supplied to the power drive unit 7 from the battery 3, to the motor 2 via a three-phase three-wire system.

In addition, reference numeral 9 is a 12 V battery for driving various accessories, and connects to the battery 3 via a converter 8. The converter 8 decreases the voltage from the battery 3 and supplies it to the 12 V battery.

Reference numeral 10 is a precharge contactor and reference numeral 11 is a main contactor. The battery 3 and the power drive unit 7 are connected via these contactors. The ON/OFF control of the precharge contactor 10 and the main contactor 11 is carried out by the motor control device 5.

Reference numeral 12 is a sensor that calculates the position and rotation speed of the motor 2, and reference numeral 13 is a current sensor that detects currents flowing through a three-phase three-wire system. The detected values of these sensors 12 and 13 are input into the motor control device 5.

Reference numeral 14 is a voltage sensor that detects the voltage of the input part of the power drive unit 7, and reference numeral 15 is a current sensor that detects the current input into the power drive unit 7. Reference numeral 16 is a voltage sensor that detects the output voltage of the battery 3. The voltage values and current values detected by each of these voltage and current sensors (14–16) are input into the motor control device 5.

Reference numeral 17 is a current sensor on the battery 3 side that detects the current flowing through battery 3 through the contactor, and the detected current values are input into the battery control device 6.

In this manner, the sensors 14 to 15 detect the voltage and current of the output side of the battery 3 and the sensor 16 and 17 detect the voltage and current of the input side of the power drive unit 7 before passing through the contactors 10 and 11. In addition, the current detected by the current sensor 15 indicates a current value subtracted a current component flowing the converter 8 from the current output from the battery 3.

Next, the operation of the control device for the hybrid vehicle comprising the above-described structure will be briefly explained.

First, the battery control device 6 calculates the state of charge in the battery 3 by the values of the input current, the voltage, and the temperature etc. at the battery side, and outputs the state of charge to the motor control device 5. The motor control device 5 outputs the received state of charge to the engine control device 4.

Engine control device 4 determines the mode (assistance, regeneration, start-up, deceleration, etc.) and the necessary energy for the motor 2 by the state of charge, the engine speed, the degree of throttle opening, engine torque, the actual torque of the motor, etc, and outputs the mode and electric power requirement to the motor control device 5.

When the motor control device 5 receives the mode and the electric power requirement from the engine control device 4, during assistance or deceleration, feedback is carried out such that the electrical power on the input side of the power drive unit 7 (the side of the voltage sensor 14 and the current sensor 15 in FIG. 1) furnishes the required electrical power according to the requirement received from the engine control device 5, and the motor control device 5 calculates the torque. At the same time, during cruising, feedback is carried out such that the power value of the battery 3 (the voltage sensor 16 and the current sensor 17 in FIG. 1) furnishes the required electrical power, and the motor control device calculates the torque. When the torque is calculated in this manner, the motor control device 5 controls the power drive unit 7 according to the calculated torque. In addition, during start-up, the motor control device 5 carries out engine start-up control using the motor 2 by controlling the power drive unit 7.

Next, when motor control device 5 receives the actual torque from the power drive unit 7, it outputs the actual torque to the engine control device 4.

The engine control device 4, the motor control device 5, and the battery control device 6 carry out control of the engine 1, the motor 2, and the battery 3 by carrying out at the above-described specified timing continuous control to drive the hybrid vehicle.

Figure 2:
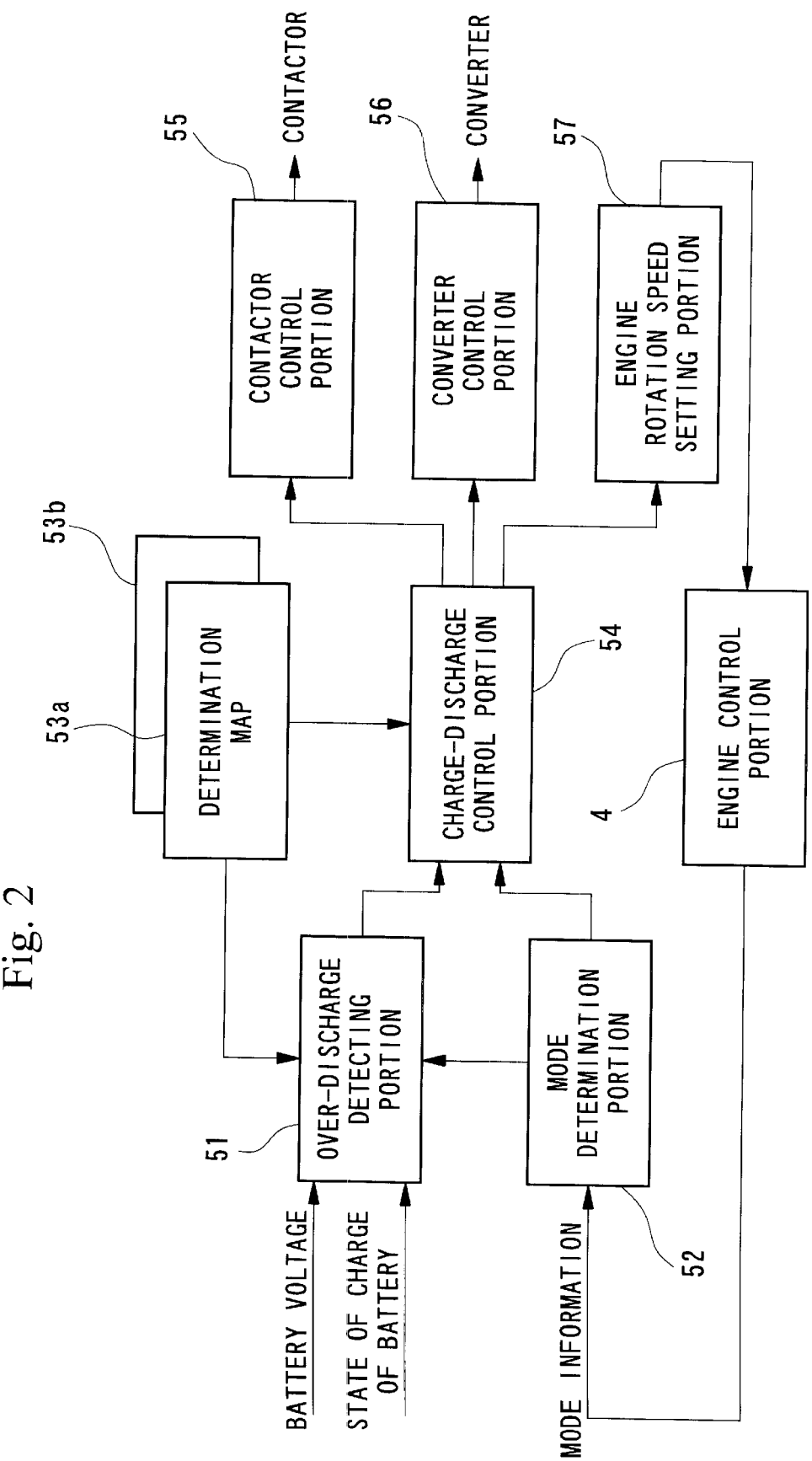
FIG. 2 is a block diagram showing the structure of the control apparatus.

Next, a control device is explained with reference to FIG. 2. FIG. 2 is a block diagram showing the structure of the control device. In FIG. 2, reference numeral 51 denotes an over-discharge detecting portion for detecting whether or not the battery 3 is in the over-discharge state based on the voltage and the state of charge of the battery 3. Reference numeral 52 denotes a mode determination portion for identifying the driving modes of the hybrid vehicle. Reference numeral 53a denotes a determination map which defines measures to be taken for the battery 3 when the battery 3 is in the over-discharge state in the idle mode. Reference numeral 53b denotes a determination map which defines measures to be taken for the battery 3 when the battery 3 is in the over-discharge state in the idle-stop mode.

Reference numeral 54 denotes a charge-discharge control portion for executing measure for the battery 3, referring to the identification maps 53a and 53b. Reference numeral 55 denotes a contactor control portion for carrying out the ON/OFF control of the main contactor 11. Reference numeral 57 denotes an engine rotation speed setting portion for instructing the engine control device 4 to increase the idle rotation number of the engine or to restart the engine.

It is noted that the over-discharge detecting portion 51, the mode determination portion 52, the determination maps 53a and 53b, the charge-discharge control portion, the contactor control portion 55, the converter control portion 56, and the engine rotation speed control portion 57 are provided in the motor control device 5.

Figure 3:
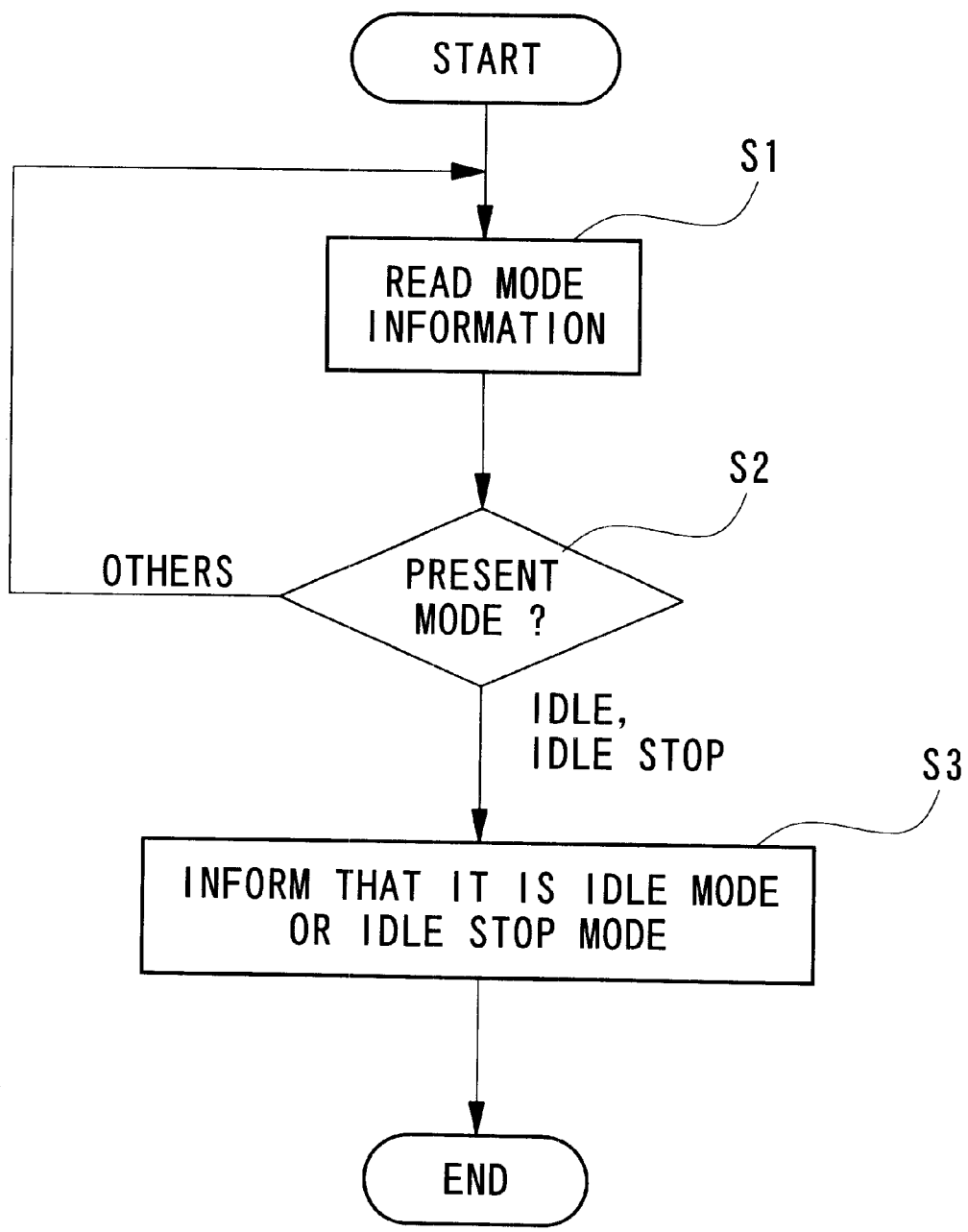
FIG. 3 is a flow-chart showing an operation of the mode determination portion 52 in FIG. 2.
Figure 4:
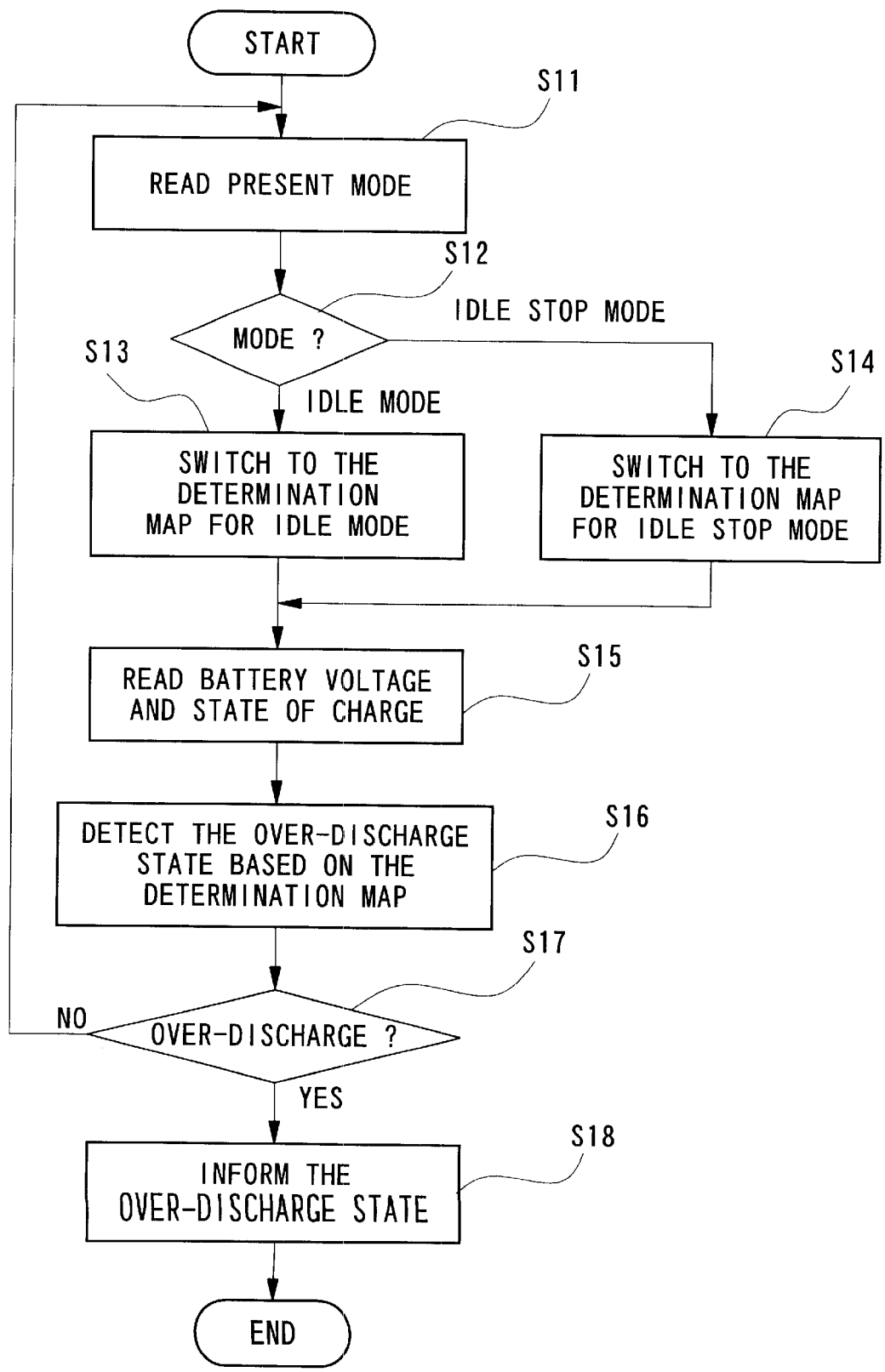
FIG. 4 is a flow-chart showing an operation of the mode determination portion 51 in FIG. 2.
Figure 5:
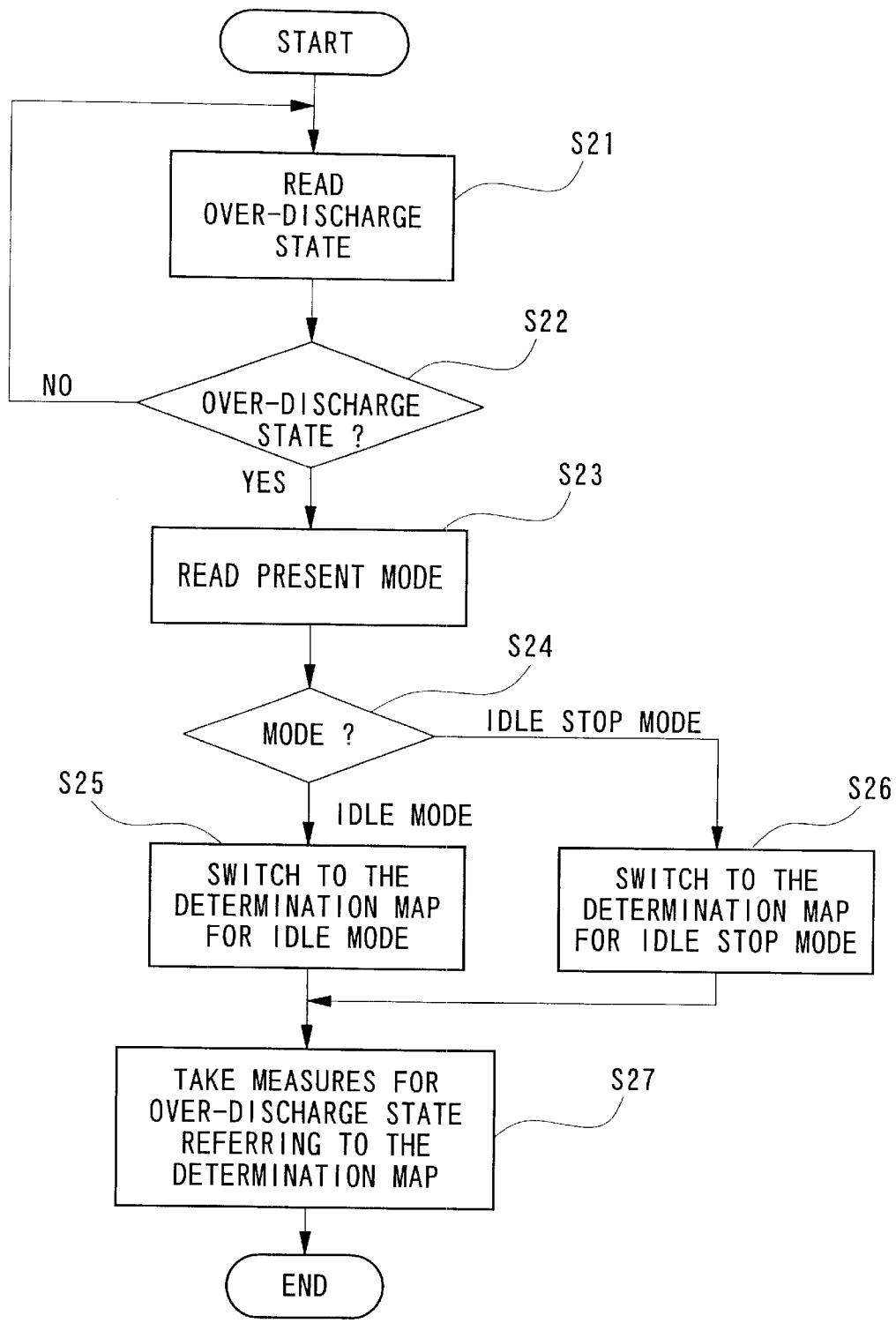
FIG. 5 is a flow-chart showing an operation of the charge-discharge control portion 54 in FIG. 2.

Next, the operation of the control device shown in FIG. 2 is explained with reference to FIGS. 3 to 7. FIG. 3 is a flow-chart showing the operation of the mode determination portion 52 shown in FIG. 2. FIG. 4 is a flow-chart showing the operation of the over-discharge detecting portion 51. FIG. 5 is a flow-chart showing the operation of the charge-discharge control portion 54. Furthermore, FIGS. 6 and 7 are diagrams showing the structure of the determination map 53a and 53b shown in FIG. 2.

First, the determination maps 53a and 53b will be explained with reference to FIGS. 6 and 7. FIG. 6 illustrates the determination map, which is referred to when the driving mode is an idle stop mode, and which defines the operation in response to the state of charge of the battery or the battery voltage. In this example, it is defined to restart the engine when the state of charge of the battery becomes equal to or less than 20% or when the battery voltage becomes equal to or less than 120 V. It is also defined to turn OFF the main contactor 11 when the state of charge becomes equal to or less than 10% or when the battery charge becomes equal to or less than 108 V.

FIG. 7 illustrates the determination map 53b, which is referred to when the driving mode is in an idle mode. Similar to the determination map 53a, the determination map 53b defines the operation in response to the state of charge of the battery or the battery voltage. In this example, it is defined to increase the engine idle speed of the engine when the state of charge of the battery becomes equal to or less than 20% or when the battery voltage becomes equal to or less than 120 V. It is also defined to turn OFF the main contactor 11 when the state of charge becomes equal to less than 10% or the battery voltage becomes equal to or less than 108 V.

Next, the operation executed by the mode determination portion 52 for determining the mode is explained with reference to FIG. 3.

First, the mode determination portion 52 reads mode information output from the engine control device 4 (step S1). Driving modes of the hybrid vehicle include the assist mode, regeneration mode, deceleration mode, idle mode, and idle stop mode. The idle mode is the mode when the engine 1 is in the idle rotation. The idle stop mode is a mode wherein the fuel to be supplied to the engine is stopped when prescribed conditions are satisfied while the engine 1 is in the idle mode. The engine control device 4 selects any one of the above-described driving modes in response to the driving circumstances and outputs the selected driving mode to the motor control device 5. When received, the motor control device 5 controls the motor in response to the driving mode. Here, mode information read in the motor control device is the same as that provided by the engine control device 4 for controlling the motor 2.

Next, the mode determination portion 52 determines which driving mode is read (step S2). If the result of the determination is the idle mode or the idle stop mode, the flow proceeds to step S3, and if the result is neither the idle mode nor the idle stop mode, the flow returns to step S1.

When the result of the determination in step S2 is the idle mode or the idle stop mode, the result is provided to the over-discharge detecting potion 51 and the charge-discharge control portion 54 (step S3). At this time, the information is sent in a form so that it can be distinguished whether it is the idle mode or the idle stop mode.

As described above, the mode determination portion 52 provides the present driving mode to the over-discharge detecting portion 51 and the charge-discharge control portion 54 only when the engine rotation speed is equal to or less than the idle rotation number and when the driving mode is either the idle mode or the idle stop mode in which the amount of generation by the motor becomes small. It is noted that the mode determination portion 52 executes the operations shown in FIG. 3 repetitively.

Next, the operation of the over-discharge detecting portion 51 for detecting the over-discharge state of the battery 3 is described.

First, the over-discharge detecting portion 51 reads the present driving mode output from the mode determination portion 52 (step S11). The thus read driving mode is either the idle mode or the idle stop mode, because the output of the mode determination portion 52 is read.

Next, the over-discharge detecting portion 51 determines which driving 20 mode is read (step S12). If the result of the determination is the idle mode, the determination map is switched to the determination map 53a suitable for the idle mode (step S13). In contrast, if the result is the idle stop mode, the determination map is switched to the determination map 53b suitable for the idle stop mode (step S14).

Next, the over-discharge detecting portion 51 reads the voltage of the battery 3 and the state of charge of the battery provided by the battery control device 6 (step S15). The output of the voltage sensor 16 is used as the voltage of the battery 3.

Next, the over-discharge detecting portion 51 detects the over-discharge state of the battery 3 based on any one of the determination maps 53a and 53b and the battery voltage and the state of charge of the battery obtained from the battery control device 6 (step S16). The over-discharge state is determined when any one of the state of charge of battery provided by the battery control device 6 or the battery voltage detected by the voltage sensor 16 is decreased below the predetermined value (for example, the state of charge is 20% or the battery voltage is 120 V).

It is determined in step 17 whether the battery 3 is in the over-discharge state based on the detected results in step S16. If the result of this determination shows that it is not in the over-discharge state, the flow returns to step S11 and repeats the above-described processes.

If the result of the determination in step S17 indicates that the battery 3 is in the over-discharge state, the over-discharge detecting portion 51 informs the charge-discharge control portion 54 of the over-discharge state of the battery 3 (step S18). This notification includes the present state of charge, which is within a range of 20% to 0%. Even when over-discharge is detected by the battery voltage, the battery voltage is replaced with the state of charge, and this state of charge is informed to the charge-discharge control portion.

As described above, the over-discharge detecting portion detects the over-discharge state with reference to a determination map selected by switching two determination maps including a map suitable for the idle mode and a map suitable for the idle stop mode depending upon the driving mode, and the thus detected state is informed to the charge-discharge control portion 54. The over-discharge detecting portion 51 executes the operation shown in FIG. 4 repetitively.

Next, the operation executed by the charge-discharge control portion 54 for protecting the battery 3 is explained with reference to FIG. 5. First, the charge-discharge control portion 54 reads the over-discharge state output from the over-discharge detecting portion 51 (step S21). Subsequently, the charge-discharge control portion 54 determines whether the thus read information indicates the over-discharge state (step S22). If the result of the determination indicates that the information does not indicate the over-discharge state, the charge-discharge control portion 54 returns to step S21 and stands by until the information indicating the over-discharge state arrives.

When the information from the over-discharge detecting portion 51 indicates that the battery 3 is in the over-discharged state, the charge-discharge control portion 54 reads the present mode output from the mode determination portion 52. Subsequently, the charge-discharge control portion 54 selects one determination map out of two determination maps 53a and 53b in response to the thus read driving mode (step S24, S25, and S26).

Subsequently, the charge-discharge control portion 54 refers to the thus selected determination map 53a or 53b for taking a measure to protect the battery 3 (step S27). The measure to be taken for protecting the battery 3 differs according to the present driving mode. While in the idle stop mode and when the state of charge of the battery is equal to or less than 20%, the motor 2 is restarted to generate the electric power by restarting the engine 1. This process is executed by the charge-discharge control portion 54 instructing a restart of the engine to the engine rotation speed setting portion 57. When receiving this instruction, the engine rotation speed setting portion 57 sets the idle rotation number and informs the engine control device 4 of the restart of the engine 1. Thereby, since generation by the motor 2 is restarted, the electric power thus generated by the motor 2 can be stored in the battery 3.

However, since the engine 1 cannot be restarted if the engine is not ready to start safely by, for example, setting the transmission into the neutral position and by disconnecting the clutch, if the clutch is left connected by the driver, the engine 1 cannot be restarted. Even though the engine is instructed to start again, the engine cannot be restarted, and the state of charge of the battery 3 falls to less than 10%. When the state of charge of the battery 3 is equal to or less than 10%, the discharge from the battery 3 is stopped completely by instructing the main contactor 11 to turn OFF. When receiving this instruction, the contactor control portion 55 outputs a signal to turn OFF the main contactor 11, and the main contactor 11 is turn OFF. As a result, the discharge from the battery 3 is completely stopped and a further discharge from the battery 3 can be prevented.

As described above, the over-discharge of the battery 3 can be prevented by executing the steps of "renewal of generation by the restart of the engine" and "complete stop of the discharge by disconnecting all electric loads connected to the battery 3", following the decrease of the state of charge in the idle stop mode. When sufficient charge is recovered, the steps of "turn the contactor ON" and "idle stop" are executed in the stepwise manner.

In contrast, when the driving mode is in the idle mode and the state of charge of the battery 3 is equal to or less than 20%, the amount of generation by the motor 2 is increased by increasing the idle rotation number. The charge-discharge control portion 54 executes this operation by instructing an increase of the idle rotation number to the engine rotation speed setting portion 57. When receiving this instruction, the engine rotation speed setting portion 57 sets the idle rotation number and the thus set idle rotation number is informed to the engine control device 4. Thereby, the shortage in the electric power is compensated for.

In addition, when the state of charge of the battery is further reduced below 10% or less, the electric load of the battery is cut by stopping the converter 8 in addition to the increase of the idle rotation number. The charge-discharge control portion 54 executes this operation by outputting an instruction to the converter control portion 56 to stop the converter 8. When receiving this instruction, the converter control portion 56 outputs a signal to the converter 8 to stop and thereby the converter stops. The electric supply to the electric equipment is terminated, and while the converter is stopped, the electric power to the electric equipment at this time period is supplied from the 12 V battery 9. Thereby, the load on the battery 3 can be reduced. However, since the main contactor 11 is in the ON state, the electric power generated by the motor 2, when the engine 1 is in the idle rotation, can be stored in the battery 3.

As described above, the over-discharge can be prevented by the stepwise execution of the steps of "increasing the generation amount by increasing the idle rotation speed" and "cutting the electric load by stopping the converter from supplying power to the electric equipment", when the state of charge of the battery is decreasing while driving in the idle mode. When the state of charge of the battery 3 is recovered, the following steps of "starting the converter" and "initialization of the idle rotation speed" are executed in a stepwise manner.

The effect of the control device of the hybrid vehicle according to the first aspect is that it provides the capability to protect the battery from falling into the over-discharge state by stepwise execution of the steps of "increasing the generation amount by increasing the idle rotation speed" and "cutting the electric load by stopping the converter from supplying power to the electric equipment", when the state of charge of the battery is decreasing while driving in the idle mode. In addition, the control device has a further effect that the control device of the present invention can prevent an increase of fuel consumption and a reduction of the power of the hybrid vehicles.

The effect of the control device of the hybrid vehicle according to the second aspect is that it is capable of protecting the battery from falling into the over-discharge state by providing a contactor for connecting and disconnecting the current supply between the engine and the motor, an engine stop device for stopping the engine under certain driving conditions, and a battery protecting device which disconnects the contactor when the over-discharge state of the battery is detected for stopping the supply of electric power to the electric equipment while the engine is in the idling mode. That is, when the battery falls into the over-discharge state and when it is possible to generate electricity by the motor, since the supply of the electric power to the other electric equipment can be completely stopped by disconnecting the contactor, all of the electric power generated by the motor can be directed to and stored in the battery, and the advance of the over-discharge state can be prevented.

What is claimed is:

1. A control device of a hybrid vehicle, the hybrid vehicle having an engine, which outputs propulsive force for the vehicle, a motor which is connected to the said engine and which assists the output of the engine, a battery which supplies the electric power to said motor and which is charged by electric energy generated by activating said motor as a generator when the assisting driving force is not necessary, and an electric load whose electric energy is supplied by electric power generated by the motor and the battery, the device comprising:

a battery protecting device which increases an idle rotation speed when the hybrid vehicle is in an idle mode and when an overdischarge of said battery is detected and which stops supplying the electric power to said electric load when overdischarge further advances.

2. A control device of a hybrid vehicle, the hybrid vehicle having an engine which outputs propulsive force for the vehicle, a motor which is connected to said engine and which assists the output of the engine, a battery which supplies electric power to said motor and which is charged by electric energy generated by activating said motor as a generator when the assisting driving force is not necessary, an electric load whose electric energy is supplied by electric power generated by the motor and the battery, the control device comprising:

a contactor for connecting and disconnecting a current supply between said battery and said motor;

an engine stopping device which stops said engine in response to predetermined driving conditions;

a battery protecting device which restarts the engine when it is detected that the state of charge of the battery is overdischarged.

* * * * *